United States Patent
Chung (10) Patent No.: US 11,010,623 B2
(45) Date of Patent: May 18, 2021

(54) METHOD AND SYSTEM FOR DETECTING PARKING VIOLATION

(71) Applicant: MiTAC Digital Technology Corporation, Taoyuan (TW)

(72) Inventor: Jui-Ying Chung, Taoyuan (TW)

(73) Assignee: Mitac Digital Technology Corporation

( * ) Notice: Subject to any disclaimer, the term of this patent is extended or adjusted under 35 U.S.C. 154(b) by 0 days.

(21) Appl. No.: 16/869,295

(22) Filed: May 7, 2020

(65) Prior Publication Data

US 2020/0356793 A1 Nov. 12, 2020

(30) Foreign Application Priority Data

May 8, 2019 (TW) .................................. 108115843

(51) Int. Cl.

| | | |
|---|---|---|
| *G06K 9/00* | (2006.01) | |
| *G06Q 40/08* | (2012.01) | |
| *B60W 50/14* | (2020.01) | |
| *G01C 21/34* | (2006.01) | |
| *G06K 9/46* | (2006.01) | |

(52) U.S. Cl.
CPC ......... *G06K 9/00812* (2013.01); *B60W 50/14* (2013.01); *G01C 21/3461* (2013.01); *G06K 9/00798* (2013.01); *G06K 9/00818* (2013.01); *G06K 9/4652* (2013.01); *G06Q 40/08* (2013.01)

(58) Field of Classification Search
CPC ...................................................... B60Q 1/48
See application file for complete search history.

(56) References Cited

U.S. PATENT DOCUMENTS

| | | | | |
|---|---|---|---|---|
| 6,133,855 | A | * | 10/2000 | Kim ...................... B60Q 9/002 340/425.5 |
| 7,382,280 | B2 | | 6/2008 | Long |
| 8,666,117 | B2 | | 3/2014 | Bulan et al. |
| 9,064,416 | B1 | * | 6/2015 | Foster ................... G08G 1/205 |
| 9,972,201 | B2 | | 5/2018 | Wang |
| 10,019,904 | B1 | | 7/2018 | Chan et al. |
| 2009/0150073 | A1 | | 6/2009 | Caraballo |
| 2012/0148092 | A1 | | 6/2012 | Ni et al. |
| 2016/0364984 | A1 | * | 12/2016 | Chien ................ G06K 9/00771 |
| 2018/0025550 | A1 | | 1/2018 | Hudson et al. |

(Continued)

FOREIGN PATENT DOCUMENTS

| | | |
|---|---|---|
| CN | 104504908 A | 4/2015 |
| CN | 107134145 A | 9/2017 |

(Continued)

*Primary Examiner* — Nabil H Syed
*Assistant Examiner* — Cal J Eustaquio
(74) *Attorney, Agent, or Firm* — Lewis Roca Rothgerber Christie LLP (57) ABSTRACT

A method for detecting parking violation associated with a vehicle is provided and includes: after an engine unit of the vehicle is switched to an activated state, controlling an image capturing unit to continuously capture images of a surrounding environment of the vehicle; determining whether the vehicle is in a stationary state; when it is determined that the vehicle is in a stationary state, performing an image processing procedure on at least one of the images for determining whether a violation condition is met, the violation condition indicating parking violation of the vehicle; and when the determination is affirmative, generating an alert for output.

17 Claims, 4 Drawing Sheets

(56) References Cited

U.S. PATENT DOCUMENTS

2018/0350229 A1  12/2018  Yigit et al.
2020/0273113 A1* 8/2020  Walsey .................. G06Q 50/30

FOREIGN PATENT DOCUMENTS

| JP | 2002133581 A | 5/2002 |
|----|--------------|--------|
| KR | 2011090036 A | 8/2011 |
| KR | 1417679 B1   | 7/2014 |
| WO | 2014059450 A1 | 4/2014 |
| WO | 2019052353 A1 | 3/2019 |

* cited by examiner

METHOD AND SYSTEM FOR DETECTING PARKING VIOLATION

CROSS-REFERENCE TO RELATED APPLICATION

This application claims priority of Taiwanese Patent Application No. 108115843, filed on May 8, 2019.

FIELD

The disclosure relates to a method and a system for detecting parking violation.

BACKGROUND

Various traffic regulations are expected to be followed by all users of the road including vehicle drivers, cyclists and pedestrians. Violation of the traffic regulations (e.g., a moving violation) may cause inconvenience to other users of the road. In some cases, the flow of traffic on the road may be interrupted because of violation of the traffic regulations. Conventionally, automatic detection of some forms of violation of the traffic regulations (e.g., speeding, running red light, changing lanes in an illegal manner, etc.) is implemented on some roads, and some vehicles are equipped with automatic systems for automatically detecting such forms of violation of the traffic regulations.

It is noted that parking violation is one of the most common forms of violation of the traffic regulations. Common parking violations may include parking at a prohibited area (indicated by a roadside red line or yellow line), or double parking (parking parallel to another vehicle that is parked at a roadside).

SUMMARY

One object of the disclosure is to provide a method that is capable of automatically detecting parking violation of a vehicle.

According to one embodiment the disclosure, the method is implemented using a system disposed in the vehicle. The vehicle includes an engine unit, the system including a processor and an image capturing unit for capturing images of a surrounding environment of the vehicle in directions outwardly from the vehicle. The method includes steps of:

controlling, by the processor, the image capturing unit to continuously capture images of the surrounding environment of the vehicle;

determining, by the processor, whether the vehicle is in a stationary state;

when it is determined that the vehicle is in a stationary state, performing, by the processor, an image processing procedure on at least one of the images captured by the image capturing unit;

determining, by the processor, whether a result of the image processing procedure indicates that a violation condition is met, the violation condition indicating parking violation of the vehicle; and when it is determined that the violation condition is met, generating, by the processor, an alert for outputting.

Another object of the disclosure is to provide a system that is capable of implementing the above-mentioned method.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "electrically connect" may refer to a connection between two or more electronic equipment/devices/components via an electrical conductive material (which may be referred to as a direct electric connection), a connection between two or more electronic equipment/devices/components via another one or more electronic equipment/devices/components (which may be referred to as an indirect electric connection), or connection between two or more electronic equipment/devices/components using wireless technology.

Figure 1:
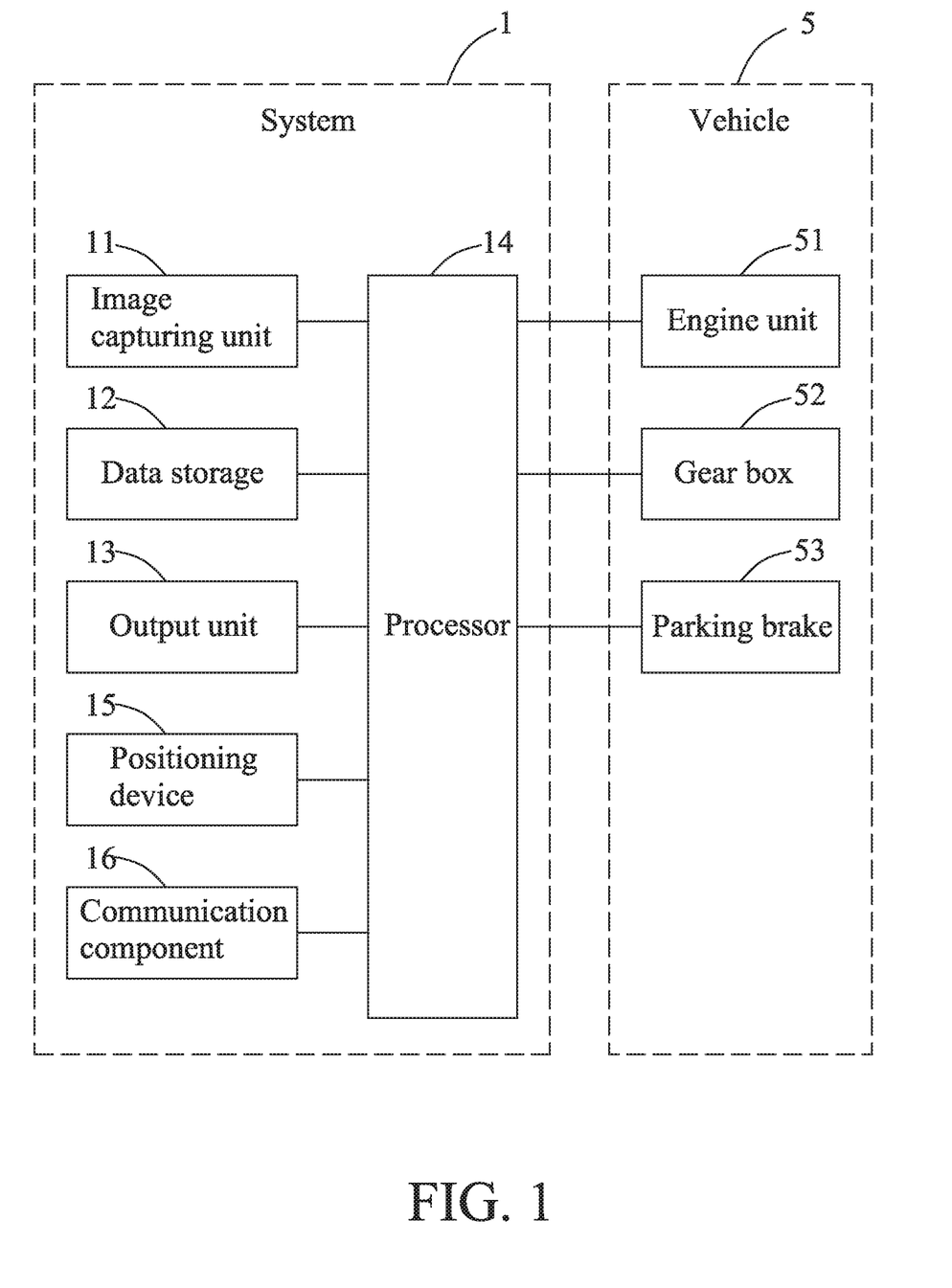
FIG. 1 is a block diagram illustrating components of a system for detecting parking violation according to one embodiment of the disclosure.

FIG. 1 is a block diagram illustrating components of a system 1 for detecting parking violation associated with a vehicle 5 according to one embodiment of the disclosure. A parking violation is for example that the vehicle 5 is parked at a prohibited area or that the vehicle 5 is parked in an unauthorized manner.

In this embodiment, the vehicle 5 may be a sedan, and may be other forms of vehicles in other embodiments.

The vehicle 5 includes an engine unit 51, a gear box 52 and a parking brake 53. It is noted that the vehicle 5 may include additional components that are generally found in a typical vehicle (such as wheels, steering wheel, etc.) and that are omitted herein for the sake of brevity.

The engine unit 51 may be embodied using a heat engine, a combustion engine, an electric motor, or other forms of engines. The engine unit 51 may be controlled by a user (e.g., a driver) to switch between an activated state and a shutdown state. In use, the user may operate a key or press a switch button for switching the engine unit 51 between the activated state and the shutdown state. In the activated state, the engine unit 51 is activated and operates to produce mechanical energy for actuating the vehicle 5, which may be operated by the user to be in motion (forward or reverse). In the shutdown state, the engine unit 51 is deactivated and does not operate. (the engine unit 51 is deactivated and does not operate, so as to make vehicle in a stationary state.)

The gear box 52 may be controlled by the user (using, for example, a gear selector or a gear stick) to operate in one of a number of transmission operating modes. In various embodiments, the transmission operating modes may include a parking mode (shown on the gear selector with the letter "P"), a neutral (no gear) mode (shown on the gear selector with the letter "N"), a drive mode (shown on the gear selector with the letter "D"), a reverse mode (shown on the gear selector with the letter "R"), a first-gear mode (shown on the gear selector with the letter "L" or a number "1"), a second-gear mode (shown on the gear selector with a number "2"), and so on.

The parking brake 53 may be operated by the user (using, for example, a stick lever, a pedal or a push button) to switch between a disengaged state and an engaged state. In the engaged state, the wheels of the vehicle 5 are prevented from moving. In the disengaged state, the wheels of the vehicle 5 are allowed to move.

In some embodiments, the system 1 is built in the vehicle 5 during manufacture, but may also be an external system that is installed on the vehicle 5 after the vehicle 5 has been manufactured.

The system 1 includes an image capturing unit 11, a data storage 12, an output unit 13, and a processor 14 that is electrically connected to the image capturing unit 11, the data storage 12, and the output unit 13. The processor 14 is further electrically connected to components of the vehicle 5 such as the engine unit 51, the gear box 52 and the parking brake 53.

The image capturing unit 11 may be embodied using a driving video recorder (DVR) with a wide angle lens that is capable of covering an angle of at least 120 degrees, and may be disposed in the vehicle 5 and face outside of the vehicle 5 for capturing images of surrounding environment of the vehicle 5 in directions outwardly of the vehicle 5. In some embodiments, the image capturing unit 11 may include a plurality of DVRs facing different directions, and therefore may be capable of covering all directions of the surrounding environment of the vehicle 5. In some embodiments, the image capturing unit 11 may be embodied using other types of digital image capturing devices that are capable of capturing image 3, such as a still camera with a continuous shooting mode (also known as a burst mode) function to rapidly capture a plurality of images in succession.

The data storage 12 may be embodied using flash memory, a hard disk, a solid state disk (SSD) or other types of non-transitory storage medium. The data storage 12 stores a software application and a dynamic image identification neural network model. The software application includes instructions that, when executed by the processor 14, causes the processor 14 to perform a number of functions as described in the succeeding paragraphs. In this embodiment, the data storage 12 further stores a digital map system.

The dynamic image identification neural network model may be trained using mask R-CNN (region-based convolutional neural networks) and a number of images containing vehicles and lines on roads. In other embodiments, the dynamic image identification neural network model may be trained using R-CNN, fast R-CNN, Faster R-CNN, you only look once (YOLO), etc.

The output unit 13 may be embodied using a touch screen with a speaker. In some embodiments, the touch screen and the speaker may be integrated as a single device such as in the DVR.

The processor 14 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

In this embodiment, the system 1 may further include a positioning device 15 that may be embodied using a global positioning system (GPS) device for obtaining a geographic position of the vehicle 5.

In this embodiment, the system 1 may further include a communication component 16 that may include a short-range wireless communication module supporting a short-range wireless communication network using a wireless technology of Bluetooth® and/or Wi-Fi, etc., and a mobile communication module supporting telecommunication using Long-Term Evolution (LTE), the third generation (3G) and/or fourth generation (4G) of wireless mobile telecommunications technology, and/or the like.

Figure 2:
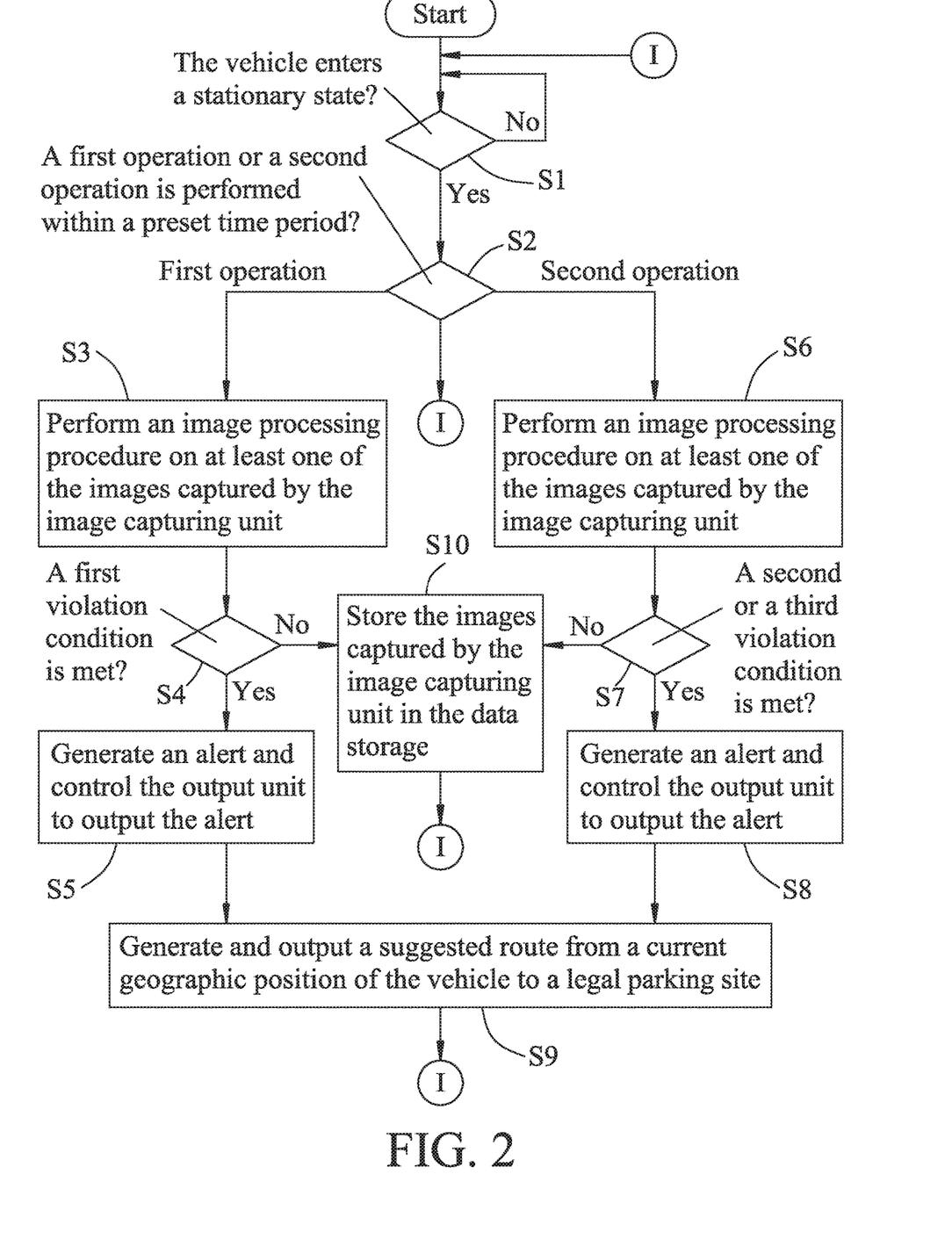
FIG. 2 is a flow chart illustrating steps of a method for detecting parking violation according to one embodiment of the disclosure.

FIG. 2 is a flow chart illustrating steps of a method for detecting parking violation associated with a vehicle according to one embodiment of the disclosure. In this embodiment, the method is implemented by the system 1 disposed on the vehicle 5 as shown in FIG. 1. In use, the processor 14 may be configured to execute the software application stored in the data storage 12, which causes the processor 14 to perform the following operations.

Specifically, after the engine unit 51 of the vehicle 5 is switched to the activated state, the processor 14 controls the image capturing unit 11 to continuously capture images of the surrounding environment of the vehicle 5. It is noted that in some embodiments, the image capturing unit 11 may be controlled to continuously capture images regardless of the state of the vehicle.

Afterward, in step S1, the processor 14 determines whether the vehicle 5 enters the stationary state. Specifically, the processor 14 may be electrically connected to a speedometer of the vehicle 5 (not shown in the drawings) to obtain information regarding speed of the vehicle 5 (e.g., a speed value). When the speed value equals zero, the processor 14 determines that the vehicle 5 is in the stationary state. In some embodiments, the processor may further detect whether the engine unit 51 is switched to the activated state to determine whether the vehicle 5 is in the stationary state.

When the determination of step S1 is affirmative, the flow proceeds to step S2. Otherwise, the processor 14 may repeat step S1 after a predetermined time period has elapsed. In some embodiments, the predetermined time period may be set to be in the range of milliseconds or microseconds based on the capabilities of the processor 14.

It is noted that, in some embodiments, the processor 14 is configured to determine whether the vehicle 5 switches from being in motion to the stationary state (by, for example, determining whether the speed of the vehicle 5 changes from non-zero to zero).

In step S2, the processor 14 detects or determines operations of the vehicle E as implemented by the driver, and determines whether a first operation or a second operation is performed within a preset time period. In this embodiment, the preset time period is two minutes.

Specifically, the first operation is that the engine unit 51 of the vehicle 5 is switched from the activated state to the shutdown state (which may indicate that the vehicle 5 is parked, and the driver may leave the vehicle 5). The second operation is that the engine unit 51 of the vehicle 5 remains in the activated state, and the gear box 52 of the vehicle 5 is shifted to the parking mode "P" or the neutral mode "N" (which may indicate that the vehicle 5 is in "standing", meaning that the engine unit 51 is still running at an idle speed and the vehicle 5 may be in motion soon).

When it is determined in step S2 that the first operation is performed, the flow proceeds to step S3. When it is determined in step S2 that the second operation is performed, the flow proceeds to step S6. On the other hand, when neither the first operation nor the second operation is performed during the preset time period, the flow goes back to step S1.

In step S3, the processor 14 performs an image processing procedure on at least one of the images captured by the image capturing unit 11. Specifically, the processor 14 may obtain the images captured by the image capturing unit 11 after step S2 is performed (the images may be taken from a video recorded by the DVR and stored in the data storage 12), and proceed to perform dynamic object identification to identify objects in the images using the dynamic image identification neural network model. In this embodiment, the image capturing unit 11 is capable of capturing images of the surrounding environment of the vehicle 5 in various directions, covering a left-front side of the vehicle 5, a front side of the vehicle 5, and a right-front side of the vehicle 5. In embodiments, the dynamic object identification may be performed with respect to various portions of the images captured. For example, in this embodiment, the dynamic object identification may be performed with respect to images of the surrounding environment at one lateral side of the vehicle 5 that is the side of a front-passenger seat (hereinafter referred to as "passenger side"). It is noted that since in different geological regions of the world, a driver's seat and the front-passenger seat may be located in different lateral sides in the vehicle 5, the dynamic object identification may be performed with respect to different portions of the images depending on the geological region in which this method is performed.

In step S4, the processor 14 determines, in a first operation mode, whether a result of the image processing procedure indicates that a first violation condition is met.

Specifically, the first violation condition indicates parking violation of the vehicle 5. The first violation condition is that a roadside yellow line or a roadside red line is detected in the image of the passenger side of the vehicle 5. This may indicate that the driver intends to park the vehicle at an area where parking is prohibited.

When the determination in step S4 is affirmative, the flow proceeds to step S5. Otherwise, the flow proceeds to step S10.

In step S5, the processor 14 generates an alert and controls the output unit 13 to output the alert. Specifically, the alert may include a text message that can be displayed by the output unit 13 or a voice message that can be outputted by the output unit 13 in an audible manner to notify the driver of a parking violation. The text message or the voice message may be, for example, that "a current parking site does not conform with the traffic regulation, please move the vehicle to a legal parking site". Additionally, the processor 14 may generate a violation record associated with the alert, and store the violation record in the data storage 12. The violation record may include a time associated with the alert, a code indicating a type of the violation, etc. Afterward, the flow proceeds to step S9.

In step S6, the processor 14 performs an image processing procedure on at least one of the images captured by the image capturing unit 11. Specifically, the processor 14 may obtain the images captured by the image capturing unit 11 after step S2 is performed, and proceed to perform dynamic object identification to identify objects in the images using the dynamic image identification neural network model. In embodiments, the dynamic object identification may be performed with respect to various portions of the images captured. In this embodiment, the dynamic object identification is performed with respect to images of the surrounding environment at the passenger side of the vehicle 5 and the driver side of the vehicle 5, in a manner similar to that of step S3.

In step S7, the processor 14 determines, in a second operation mode, whether a result of the image processing procedure indicates that a second violation condition or a third violation condition is met. When the determination in step S7 is affirmative, the flow proceeds to step S8. Otherwise, the flow proceeds to step S10.

Figure 4:
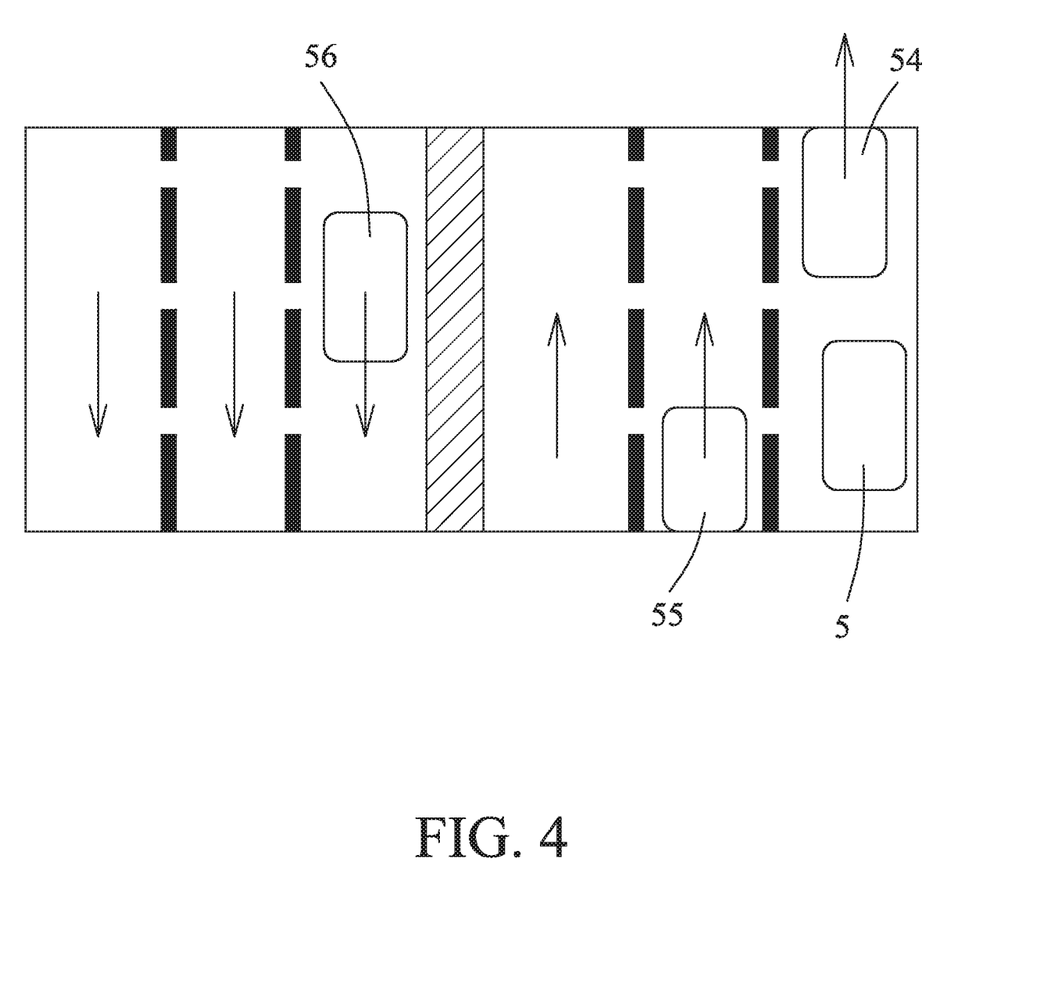
FIG. 4 illustrates an environment including a number of lanes in a road.

Specifically, the second and third violation conditions each indicate standing violation of the vehicle 5. The second violation condition is that: a reference vehicle moving in a direction parallel to a direction in which the vehicle 5 is facing (hereinafter referred to as "forward direction") is detected at a front side or one lateral side of the vehicle 5 in the plurality of images and a roadside red line is detected at the other side of the vehicle 5 in the images. For example, FIG. 4 illustrates an environment where the vehicle 5 may be located in one lane in a road, the reference vehicles may be one moving in a lane that is the same with the vehicle 5 (labeled 54), or in an adjacent lane travelling a same direction (labeled 55). In the case of Taiwan, the adjacent lane may be in the left side of the vehicle 5, and the roadside red line may be in the right side of the vehicle 5. A vehicle 56 moving in a direction opposite to the vehicle 5 is not considered for determining violation.

The third violation condition is that a reference vehicle moving in the forward direction is detected at one side of the vehicle 5 in the plurality of images and a vehicle in a stationary state is detected at the other side of the vehicle 5 in the images.

Figure 3:
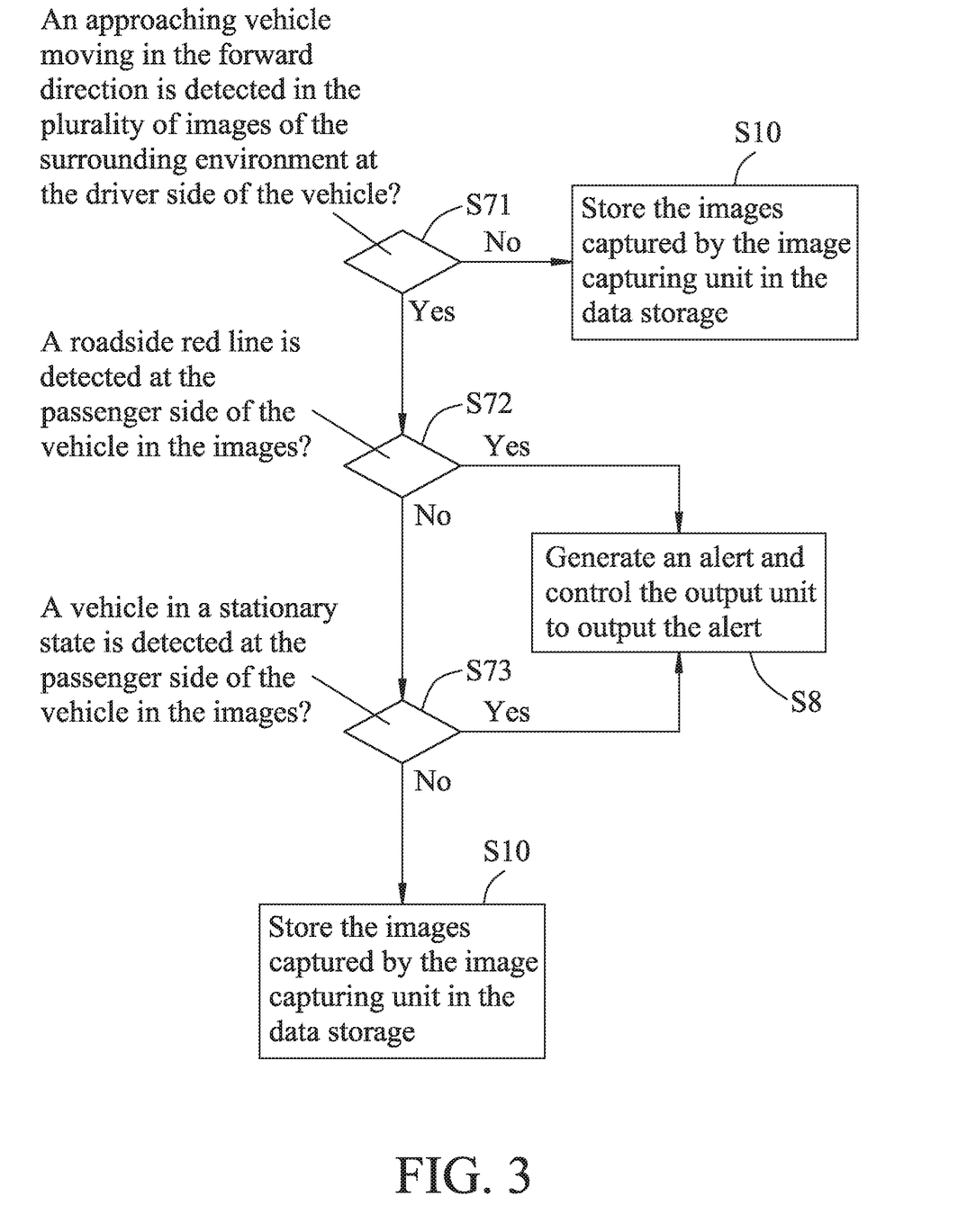
FIG. 3 is a flow chart illustrating an exemplary implementation of determining whether a violation condition is met according to one embodiment of the disclosure.

FIG. 3 is a flow chart illustrating an exemplary implementation of step S7 that includes sub-steps S71 to S73 according to one embodiment of the disclosure.

In sub-step S71, the processor 14 determines, from the images of the surrounding environment at the driver side of the vehicle 5, whether a reference vehicle moving in the forward direction is detected in the plurality of images of the surrounding environment at the driver side of the vehicle 5. It is noted that in other embodiments, the processor 14 may determine, from the images of the surrounding environment at other sides of the vehicle 5, whether a reference vehicle moving in the forward direction is detected in the plurality of images of the surrounding environment at other sides of the vehicle 5.

When such a reference vehicle is not detected, it may be deduced that the vehicle 5 may be in the stationary state for other reasons (e.g., because of traffic light or traffic congestion, and as a result other vehicles are also in the stationary state), and the flow goes to step S10. Otherwise (i.e., a reference vehicle moving in the forward direction is detected), it may be determined that the vehicle 5 is standing, and the flow proceeds to sub-step S72.

In sub-step S72, the processor 14 determines whether a roadside red line is detected at the passenger side of the vehicle 5 in the images. When the determination made in sub-step S72 is affirmative, it may be determined that the second violation condition is met (i.e., the vehicle 5 is standing in a prohibited area), and the flow proceeds to step S8. Otherwise, the flow proceeds to sub-step S73.

In sub-step S73, the processor 14 determines whether a vehicle in a stationary state is detected at the passenger side of the vehicle 5 in the images. In the case of Taiwan, the passenger side may be in the right side of the vehicle 5.

When the determination made in sub-step S73 is affirmative, it may be determined that the third violation condition is met (i.e., the vehicle 5 is in a double parking state parallel to another vehicle, which is an unauthorized manner of parking), and the flow proceeds to step S8. Otherwise, the flow goes to step S10.

In step S8, the processor 14 generates an alert and controls the output unit 13 to output the alert. Specifically, the alert may include a text message that can be displayed by the output unit 13 or a voice message that can be outputted by the output unit 13 in an audible manner to notify the driver the parking violation. The text message or the voice message may be, for example, that "a current standing site does not conform with the traffic regulation, please move the vehicle to a legal parking site". Additionally, the processor 14 may generate a violation record associated with the alert, and store the violation record in the data storage 12. The violation record may include a time associated with the alert, a code indicating a type of the violation, etc. Afterward, the flow proceeds to step S9.

In step S9, the processor 14 obtains map information from the digital map system, generates a suggested route from a current geographic position of the vehicle 5 to a legal parking site according to the map information, and controls the output unit 13 to output the suggested route.

Specifically, the digital map system is stored in the data storage 12 in this embodiment, or may be downloaded from the Internet using the communication component 16 in other embodiments. The map information may include a list of legal parking sites and road segments, and the processor 14 may determine one of the legal parking sites or road segments that is closest to the current geographic position of the vehicle 5 and generate the suggested route accordingly. Afterward, the processor 14 may control the output unit 13 to display a map with the suggested route.

In step S10, the processor 14 stores the images captured by the image capturing unit 11 in the data storage 12. In this embodiment, the processor 14 stores the video recorded by the DVR in the data storage 12. Based on a capacity of the data storage 12, the stored images may be kept in the data storage 12 for a preset time period (e.g., 60 days) before being deleted. In this manner, the recorded images/video may be useful for providing evidence in cases that a traffic ticket is incorrectly issued to the owner of the vehicle 5. It is noted that in some embodiments, the images captured by the image capturing unit 11 may be uploaded using the communication component 16 to a cloud server for storage.

In some embodiments, the violation record(s) stored in the data storage 12 may be uploaded periodically (e.g., once every 10 days or once a month) to an insurance server belonging to a usage-based insurance (UBI) institution. An insurance premium of the vehicle insurance for the vehicle 5 may be determined or adjusted dynamically based on the violation record (s). In some embodiments, the processor 14 may further process the violation record(s) to calculate a set of violation statistics that includes one or more of a number of times the vehicle 5 was parked during a period of 10 days or a month, a number of times the vehicle 5 was standing during the period, a number of parking violations during the period, a number of standing violations during the period, a rate of parking violations during the period (the number of parking violations divided by the number of times the vehicle 5 was parked), and a rate of standing violations during the period (the number of standing violations divided by the number of times the vehicle 5 was standing).

In some embodiment, the determination of whether the vehicle 5 is parked or standing in a prohibited area or in an unauthorized manner may be done by the processor 14 obtaining the current geographic location of the vehicle 5 from the positioning device 15, obtaining the list of legal parking sites and road segments from the map information, and determining whether the vehicle 5 is parked or standing in one of the legal parking sites or road segments.

According to one embodiment of the disclosure, in the method for detecting parking violation, the processor 14 may be further configured to perform the following steps.

When the determination of step S1 is affirmative, the processor 14 records an operation log regarding a plurality of manual operations that are done to the gear box 52 and the parking brake 53.

Afterward, the processor 14 determines an order of the operations based on the operation log (hereinafter referred to as "driver operation order").

Then, the processor 14 compares the driver operation order and a preset order. It is noted that the preset order may be an order that is recommended by the manufacturer of the vehicle 5 during the parking of the vehicle 5, so as to ensure that the service life and performance of the vehicle 5 is not adversely affected by inappropriate user operation.

As an example, the preset order includes the following operations in the given order:
  i. switching the gear box 52 to the neutral mode "N";
  ii. switching the parking brake 53 to the disengaged state; and
  iii. switching the gear box 52 from the neutral mode "N" to the parking node "P".

In this embodiment, when it is determined that the driver operation order does not conform with the preset order (e.g., switching the gear box 52 directly to the parking mode), the processor 14 may generate a notification (which may include a text message and/or an audible sound message) and control the output unit 13 to output the notification. In some examples, the processor 14 may control the output unit 13 to further output the preset order in a form of a text message and/or a voice message.

In some examples, the processor 14 may further control the communication component 16 to upload the operation log to the insurance server.

According to one embodiment of the disclosure, the processor 14 may transmit the images captured by the image capturing unit 11 to an image identification server (not depicted in the drawings) via the communication component 16. The image identification server may store the software application and the dynamic image identification neural network model as described above.

In this case, the operations of steps S3 and S6 may be done by the image identification server, and a result thereof may be transmitted back to the system 1 for further processing.

In embodiments, the determination of whether a result of the image processing procedure indicates that a violation condition is met may incorporate additional conditions to fit the regulations of various countries.

In one embodiment, in step S3, the image processing procedure further determines whether a parking sign is detected. When the parking sign is detected, the processor 14 may further detect text characters on the parking sign to recognize a text message on the parking sign (or a traffic sign).

In one embodiment, the image processing procedure further determines whether a curb painted with a specific color is detected in the at least one image of the surrounding environment.

In step S4, the processor 14 determines, in the first operation mode, whether a result of the image processing procedure indicates that a first violation condition is met.

Specifically, the first violation condition indicates parking violation of the vehicle 5. The first violation condition is that the text message indicates a no-parking zone that currently prohibits parking.

Specifically, when the words such as "No parking" or "Tow away" are detected, the processor 14 may determine that the first violation condition is met. In some cases, words indicating that parking is permitted during specified times for up to a specified duration (e.g., 2 hour parking, 9 A.M to 6 P.M., Mon thru Fri) or prohibited during specified times (e.g., no parking, 9 A.M to 6 P.M., MON WED FRI SAT) may be detected, and the processor 14 may determine whether the first violation condition is met further according to a current time obtained from a clock component (which may be embodied using a real time clock (RTC) module).

In some examples, the specific colors of the curb indicate various parking regulations. In one example, the color red indicates that parking is prohibited, the color white indicates that the driver is required to remain in the vehicle 5 for picking up a passenger, the color yellow indicates that the zone is used for loading cargo in specific time periods (e.g., daytime) and permits parking in other time periods (e.g., nighttime), the color green indicates that parking for a limited time period (e.g., 2 hours) is permitted, and the color blue indicates that the area is reserved for vehicles with special permits or certifications.

It is noted that in different countries different regulations may be applicable, and the relevant regulations may be pre-stored in the data storage 12.

As a result, in determining whether the first violation condition is net, the processor 14 may further utilize the color of the curb, the current time, and the current geographic location of the vehicle 5.

In step S7, the processor 14 determines, in the second operation mode, whether a result of the image processing procedure indicates that a second violation condition is met.

Specifically, the second violation condition indicates standing violation of the vehicle 5. The second violation condition is that the text message indicates a no-stopping zone that currently prohibits standing.

Specifically, when the words such as "No standing", "Tow away" are detected, the processor 14 may determine that the second violation condition is met. In some cases, words indicating that parking is permitted during specified times for up to a specified duration (e.g., 2 hour parking, 9 A.M to 6 P.M., Mon thru Fri) or prohibited during specified times (e.g., no parking, 9 A.M to 6 P.M., MON WED FRI SAT) may be detected, and the processor 14 may determine whether the second violation condition is met further according to the current time.

Additionally, in determining whether the first violation condition is net, the processor 14 may further utilize the color of the curb, the current time, and the current geographic location of the vehicle 5 as described above.

To sum up, embodiments of the disclosure provide a method and a system 1 for detecting parking violation associated with a vehicle. In the method, the processor 14 determines whether the vehicle 5 is in the stationary state, and when the determination is affirmative, performs an image processing procedure on at least one of the images captured by the image capturing unit 11, and determines whether a result of the image processing procedure indicates that a violation condition is met, which indicates that the vehicle is stopped at a prohibited area or in an unauthorized manner. When the violation condition is met, the processor 14 generates an alert, and controls the output unit 13 to output the alert for notifying the driver of a parking viola-tion, i.e., that the vehicle 5 is parked or standing in a prohibited area or in an unauthorized manner.

In the embodiments, the processor 14 determines whether the vehicle 5 is in the parked state or is standing, and adopts different conditions to determine whether the vehicle is stopped at a prohibited area or in an unauthorized manner.

In some embodiments, the processor 14 further generates a suggested route for suggesting the driver of the vehicle 5 to move the vehicle 5 to a legal parking site or road segment.

In the description above, for the purposes of explanation, numerous specific details have been set forth in order to provide a thorough understanding of the embodiments. It will be apparent, however, to one skilled in the art, that one or more other embodiments may be practiced without some of these specific details It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for detecting parking violation associated with a vehicle, the method being implemented using a system disposed in the vehicle, the vehicle including an engine unit, the system including a processor and an image capturing unit for capturing images of a surrounding environment of the vehicle in at least one direction, the method comprising steps of:
    controlling, by the processor, the image capturing unit to continuously capture images of the surrounding environment of the vehicle;
    determining, by the processor, whether the vehicle enters a stationary state;
    when it is determined that the vehicle is in a stationary state, performing, by the processor, an image processing procedure on at least one of the images captured by the image capturing unit;
    determining, by the processor, whether a result of the image processing procedure indicates that a violation condition is met, the violation condition indicating parking violation of the vehicle; and
    when it is determined that the violation condition is met, generating, by the processor, an alert for outputting;
    wherein the step of performing an image processing procedure includes performing the image processing procedure on at least one image of the surrounding environment at a lateral side of the vehicle; and
    wherein in the step of determining whether a result of the image processing procedure indicates that a violation condition is met, the violation condition is that one of a roadside yellow line and a roadside red line is detected in the at least one image of the surrounding environment at the lateral side of the vehicle.

2. The method of claim 1, wherein:
in the step of determining whether a result of the image processing procedure indicates that a violation condition is met, the violation condition further includes that one of a roadside red line and a vehicle in a stationary state is detected at the lateral side of the vehicle in the at least one image of the surrounding environment at the lateral side of the vehicle.

3. The method of claim 2, wherein:
the step of performing an image processing procedure further includes performing the image processing procedure on a plurality of images of the surrounding environment at a front side of the vehicle and a plurality of images of the surrounding environment at the other lateral side of the vehicle; and
in the step of determining whether a result of the image processing procedure indicates that a violation condition is met, the violation condition further includes that a reference vehicle moving in a direction parallel to a direction in which the vehicle is facing is detected in the plurality of images of the surrounding environment at the front side or the other lateral side of the vehicle.

4. The method of claim 1, the vehicle including an engine unit and a gear box, the method further comprising steps of:
when it is determined that the vehicle is in a stationary state, determining whether the engine unit of the vehicle is switched from an activated state to a shutdown state; and
implementing the step of determining whether a result of the image processing procedure indicates that a violation condition is met only when it is determined that the engine unit is switched from the activated state to the shutdown state.

5. The method of claim 1, the vehicle including an engine unit and a gear box, wherein the method further comprises steps of:
when it is determined that the vehicle is in a stationary state, determining whether the engine unit of the vehicle remains in an activated state and the gear box of the vehicle is shifted to one of a parking mode and a neutral mode; and
implementing the step of determining whether a result of the image processing procedure indicates that a violation condition is met only when it is determined that the engine unit remains in the activated state and the gear box is shifted to one of the parking mode and the neutral mode.

6. The method of claim 5, wherein the step of determining whether a result of the image processing procedure indicates that a violation condition is met further includes:
determining whether a reference vehicle moving in a direction the same as a direction in which the vehicle is facing is detected at a front side or one lateral side of the vehicle in the plurality of images; and
when it is determined that a reference vehicle is detected, determining whether a roadside red line is detected at the other lateral side of the vehicle in the plurality of images, and when detected, determining that the violation condition is met.

7. The method of claim 6, wherein the step of determining whether a result of the image processing procedure indicates that a violation condition is met further includes:
when it is determined that a roadside line is not detected, determining whether a vehicle in the stationary state is detected at the other lateral side of the vehicle in the plurality of images, and when detected, determining that the violation condition is met.

8. The method of claim 1, the system further including an output unit, wherein the step of generating an alert includes;
generating a message associated with the alert; and
controlling the output unit to output the message in an audible manner.

9. The method of claim 1, the system further including a data storage, wherein the method further comprises steps of:
generating a violation record associated with the alert; and
storing the violation record in the data storage.

10. The method of claim 1, the system further including an output unit, the vehicle including a gear box and a parking brake, the method further comprising:
recording, by the processor, an operation log regarding a plurality of manual operations that are done to the gear box and the parking brake by a driver of the vehicle;
determining, by the processor, a driver operation order based on the operation log;
comparing, by the processor, the driver operation order and a preset order; and when it is determined that the driver operation order does not conform with the preset order, generating a notification and controlling the output unit to output the notification.

11. The method of claim 1, the system further including an output unit, and a positioning device for obtaining a geographic position of the vehicle, wherein the method further comprises steps of:
when it is determined that the result of the image processing procedure indicates that the violation condition is met, obtaining, by the processor, map information from a digital map system;
generating a suggested route from the geographic position of the vehicle to a legal parking site based on the map information; and
controlling the output unit to output the suggested route.

12. The method of claim 1, the system further including a data storage, the method further comprising a step of:
when it is determined that the result of the image processing procedure indicates that the violation condition is not met, storing the images captured by the image capturing unit in the data storage.

13. The method of claim 1, the system further including a data storage, the method further comprising a step of:
when it is determined that the result of the image processing procedure indicates that the violation condition is met, generating, by the processor, a violation record associated with the alert;
periodically processing the violation record to calculate a set of violation statistics; and
uploading the set of violation statistics to an insurance server belonging to a usage based insurance (UBI) institution.

14. The method of claim 1, wherein the step of performing an image processing procedure further includes performing the image processing procedure on at least one image of the surrounding environment at one of a front side and a lateral side of the vehicle; and
in the step of determining whether a result of the image processing procedure indicates that a violation condition is met, the violation condition includes that a parking sign is detected in the at least one image of the surrounding environment, and the parking sign indicates one of a no-parking zone and a no-stopping zone.

15. The method of claim 14, wherein the step of determining whether a result of the image processing procedure indicates that a violation condition is met includes recognizing a text message on the parking sign, and determining whether the text message indicates one of a no-parking zone and a no-stopping zone.

16. The method of claim 1, wherein the step of performing an image processing procedure further includes performing the image processing procedure on at least one image of the surrounding environment at one of a front side and a lateral side of the vehicle; and     in the step of determining whether a result of the image processing procedure indicates that a violation condition is met, the violation condition is that a curb painted with a specific color is detected in the at least one image of the surrounding environment, and the specific color indicates one of a no-parking zone and a no-stopping zone.

17. A system for detecting parking violation associated with a vehicle that includes an engine unit, the system being disposed in the vehicle and comprising a processor and an image capturing unit for capturing images of a surrounding environment of the vehicle in at least one direction,     wherein the system is configured to implement the method for detecting parking violation of claim 1.

\* \* \* \* \*